US 6,557,167 B1

United States Patent
Thelen (10) Patent No.: US 6,557,167 B1
(45) Date of Patent: Apr. 29, 2003

(54) APPARATUS AND METHOD FOR ANALYZING PERFORMANCE OF A COMPUTER PROGRAM

(75) Inventor: Michael Sylvester Thelen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/390,097

(22) Filed: Sep. 3, 1999

(51) Int. Cl.[7] .................................................. G06F 9/44
(52) U.S. Cl. ..................... 717/127; 717/130; 717/131
(58) Field of Search .................... 717/127, 124–135, 717/154–158; 714/37, 38, 39; 345/733–759, 764–769; 707/3–5

(56) References Cited

U.S. PATENT DOCUMENTS

| 5,819,094 A | * 10/1998 | Sato et al. ................... 717/131 |
| 5,835,705 A | * 11/1998 | Larsen et al. ................ 709/107 |
| 6,052,708 A | * 4/2000 | Flynn et al. ................. 709/108 |
| 6,199,199 B1 | * 3/2001 | Johnston et al. ............. 717/125 |
| 6,256,773 B1 | * 7/2001 | Bowman-Amuah ......... 717/121 |
| 6,330,008 B1 | * 12/2001 | Razdow et al. ............. 345/766 |
| 6,351,724 B1 | * 2/2002 | Klassen et al. ............... 714/39 |

OTHER PUBLICATIONS

Hollingsworth et al. The Integration of Application and System Based Metrics in a Parallel Program Performance Tool. ACM. 1991. pp. 189–200.*
Fowler et al. An integrated Approach to Parallel Program Debugging and Performance Analysis on Large–Scale Multiprocessors. ACM. 1989. pp. 163–173.*

* cited by examiner

*Primary Examiner*—Gregory Morse
*Assistant Examiner*—Wei Zhen
(74) *Attorney, Agent, or Firm*—Martin & Associates, LLC; Derek P. Martin (57) ABSTRACT

An apparatus and method allow analyzing the performance of a computer program. The computer program is initially executed according to a predefined set of program execution conditions. As the computer program executes, information for each code segment is logged. Using the logged performance data, a graphical representation of the executed computer program is constructed. A user can then formulate ad hoc queries to analyze any desired performance parameters for the computer program by replaying how the computer program ran using the graphical representation of the executed computer program. The present invention thus allows a user to detect via queries complex performance bottlenecks that are caused by interactions between multiple code segments.

29 Claims, 6 Drawing Sheets

```
function A
{
    ⋮
    call C1;
    call C2;
}
```

FIG. 4

```
function B
{
    ⋮
    call E;
}
```

FIG. 5

```
function C1
{
    ⋮
    call D;
    ⋮
    call E;
}
```

FIG. 6

```
function C2
{
    call B;
    ⋮
    call E;
    call E;
}
```

FIG. 7

```
function D
{
    ⋮
}
```

FIG. 8

```
function E
{
    ⋮
}
```

FIG. 9 where ⋮ is any inline code not calling another function

FIG. 10

| | Query | Result |
|---|---|---|
| 1110 | Total CPU cycles for E | 50 |
| 1120 | Total CPU cycles for C2 -> wild card -> E | 30 |
| 1130 | Total CPU cycles for C* -> E | 40 |
| 1140 | Total CPU cycles for C2 -> E | 20 |
| 1150 | Total CPU cycles for C2 -> B -> E | 10 |
| 1160 | Total CPU cycles for D -> E | 0 | where:
1) "wild card" matches 0 or more calls
2) -> denotes one function calling another
3) * denotes any suffix to apply to the code segment name

FIG. 11

APPARATUS AND METHOD FOR ANALYZING PERFORMANCE OF A COMPUTER PROGRAM

BACKGROUND OF THE INVENTION

1. Technical Field

This invention generally relates to computer programming and more specifically relates to an apparatus and methods for measuring and analyzing performance of a computer program.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to test. Software applications are typically made up of a number of named code segments, known as procedures, functions, modules, objects, etc. depending on the programming language used. Object oriented applications are characterized by many small code segments, known as methods, that interact with other methods in complex ways. In particular, as the size of a software application grows, it becomes more and more difficult to determine the cause of performance bottlenecks in the application. Known performance analysis tools are designed to detect performance bottlenecks in a particular code segment. However, performance bottlenecks in a complex software application often result not from any one code segment, but instead from the way many of these code segments interact with each other. For these reasons, known performance analysis tools cannot detect performance bottlenecks that result from interactions between multiple code segments. Without a mechanism and method for detecting these types of elusive performance bottlenecks, the computer industry will continue to suffer from inefficient methods and tools for analyzing the performance of a computer program.

DISCLOSURE OF INVENTION

According to the present invention, an apparatus and method allow analyzing the performance of a computer program. The computer program is initially executed according to a predefined set of program execution conditions. As the computer program executes, information for each code segment is logged. Using the logged performance data, a graphical representation of the executed computer program is constructed. A user can then formulate ad hoc queries to analyze any desired performance parameters for the computer program by replaying how the computer program ran using the graphical representation of the executed computer program. The present invention thus allows a user to detect via queries complex performance bottlenecks that are caused by interactions between multiple code segments.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to the preferred embodiments of the present invention, an apparatus and method allow a user to collect performance data by running a computer program, and to run ad hoc queries to determine relevant performance parameters from the collected performance data. The apparatus and method of the preferred embodiments provide flexible and powerful tools in analyzing the performance of a computer program.

Figure 1:
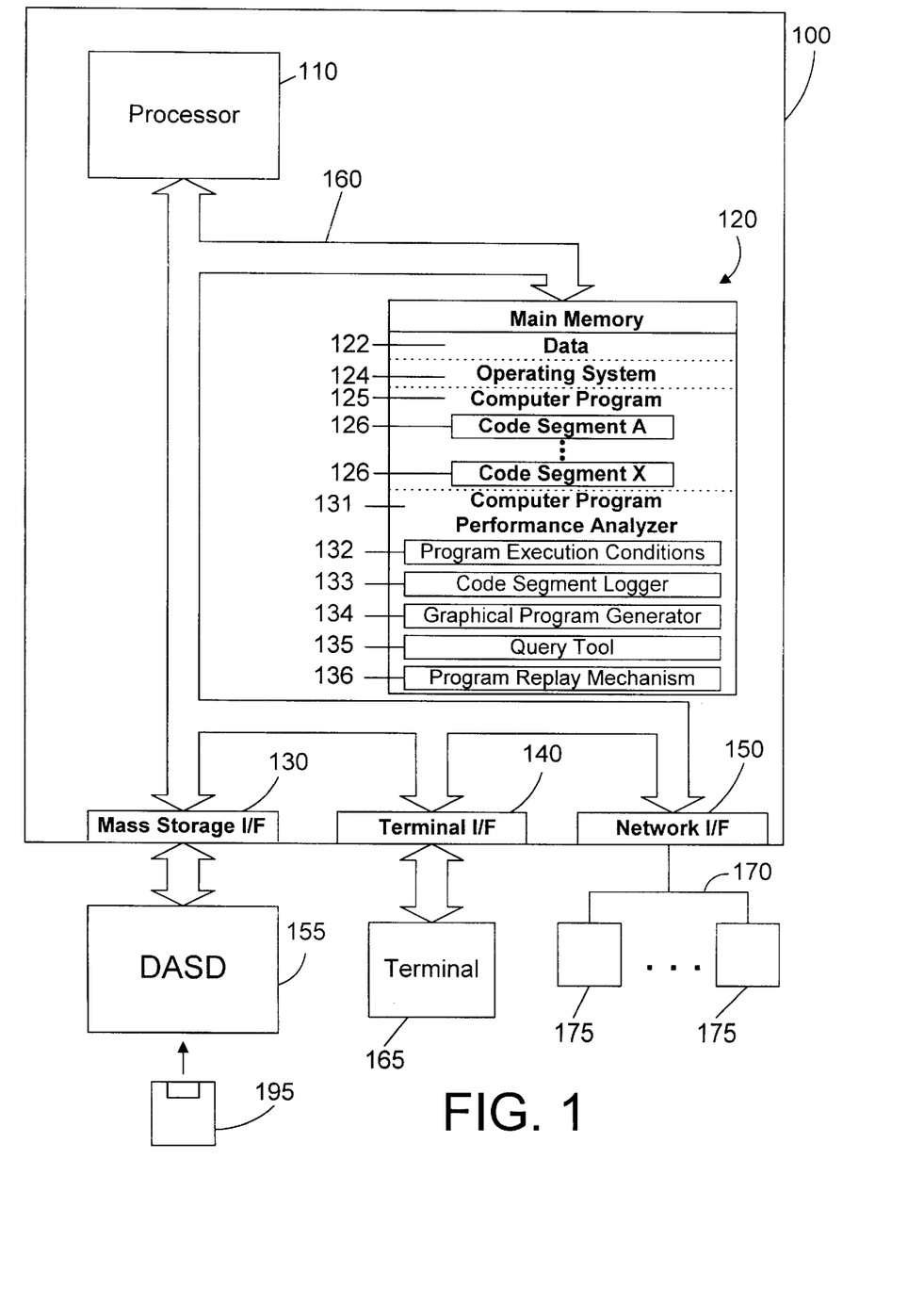
FIG. 1 is a block diagram of an apparatus in accordance with the preferred embodiments of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a computer program 125, and a computer program performance analyzer 131. The computer program contains multiple code segments 126, each of which preferably have a unique name. Computer program performance analyzer 131 includes a set of program execution conditions 132, a code segment logger 133, a graphical program generator 134, a query tool 135, and a program replay mechanism 136. Each of these items is discussed in more detail below. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, computer program 125, and computer program performance analyzer 131 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Computer program 125 represents a computer program in any form, whether source code, intermediate language, machine code, or other forms. Computer program 125 may include system programs (e.g., an operating system), application programs, or any other types and forms of computer programs. Computer program 125 is made up of multiple code segments 126. Code segments 126 may include procedures, functions, routines, sub-routines, object methods, and any other portion of executable code in a computer program that can be identified by a unique name. The type(s) of code segments 126 in a computer program 125 largely depends on the programming language used to define computer program 125.

Computer program performance analyzer 131 is a tool that is used to gather performance data for the computer program 125 to allow a user to identify performance bottlenecks and other pertinent characteristics of the computer program 125. In order to gather performance data for computer program 125, the program execution conditions 132 are defined, and the computer program 125 is run under those defined conditions 132. The term "program execution conditions" is a very broad term that includes any and all definitions and conditions that must be specified for the computer program to run. For example, if the computer program awaits input from the user at a particular point, the program execution conditions 125 might include a specific user input that causes the computer program to perform desired functions. If the computer program has conditional jumps, the program execution conditions 125 could include a specification of the condition to assure that a particular branch is taken. Needless to say, for a complex program, the number and type of program execution conditions 132 can be quite large.

Once the program execution conditions 132 are defined, the computer program 125 is executed under those conditions. A code segment logger 133 logs data for each code segment as it runs. In the preferred embodiments, code segment logger 133 logs the amount of time it took to execute the current code segment, and the other code segments that were called when the current code segment ran. Once code segment logger 133 has logged performance data for all code segments 126 in the computer program 125, this logged performance data is used by a graphical program generator 134 to generate a graphical representation of the computer program 125 that includes the performance data. Once the graphical representation of the performance data is generated by the graphical program generator 134, a user may use the query tool 135 to specify user-defined ad hoc queries on the performance data in the graphical representation. When the user submits a query, the computer program is "replayed" from the graphical representation of the performance data by a program replay mechanism 136. The computer program is "replayed" by stepping through the graphical representation, gathering information that satisfies the query (i.e., query data) at each step.

Processor 110 may be constructed from one or more microprocessors and/or integrated circuits. Processor 110 executes program instructions stored in main memory 120. For the discussion herein, the term "CPU cycles" means the number of cycles for processor 110. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
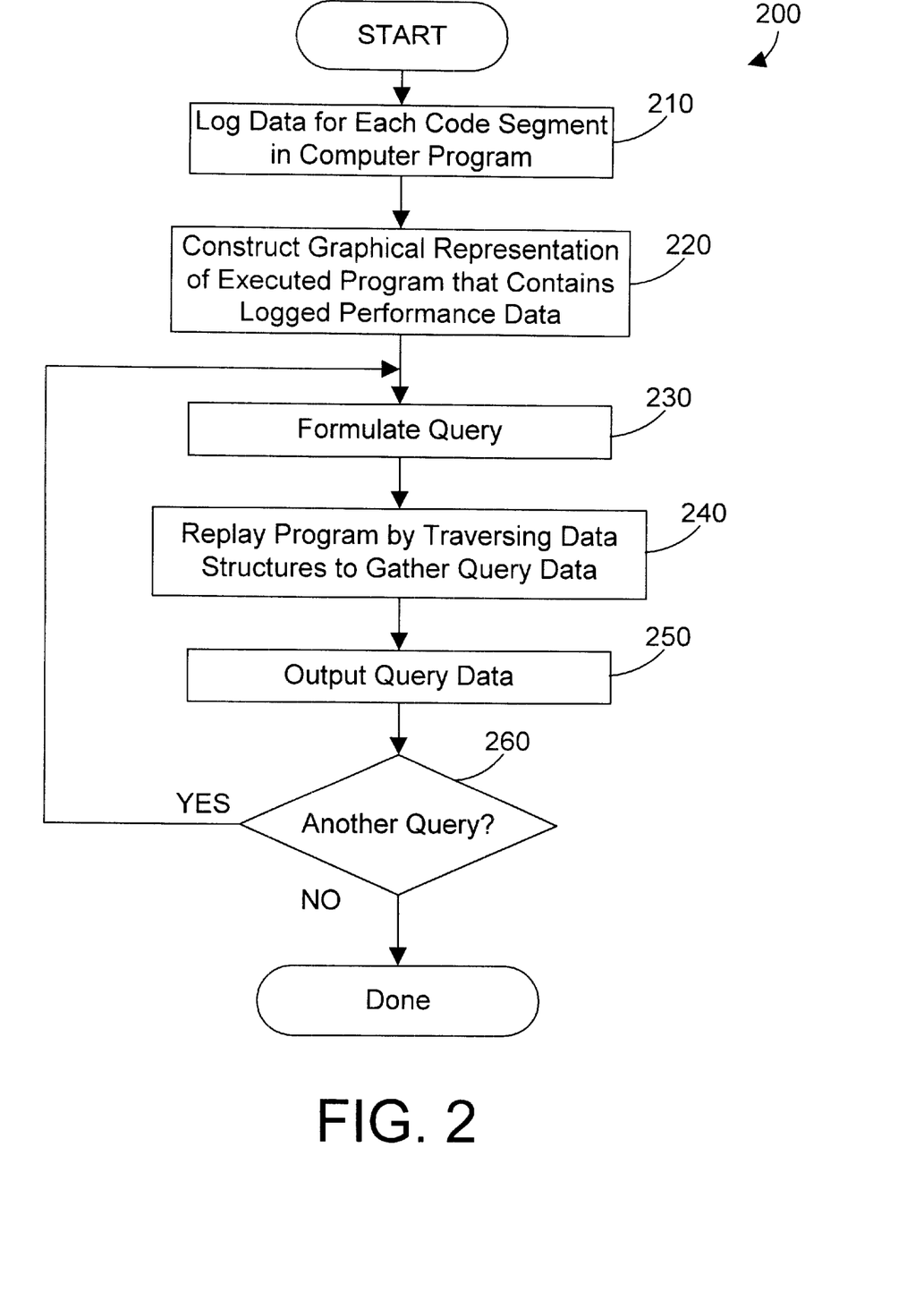
FIG. 2 is a flow diagram of a method for measuring and analyzing the performance of a computer program in accordance with the preferred embodiments.

The remainder of this specification describes how the computer program performance analyzer 131 gathers performance data and allows the user to specify ad hoc queries that help identify pertinent aspects of the computer program, such as performance bottlenecks. Referring to FIG. 2, a method 200 for gathering and analyzing performance data begins by logging data for each code segment in the computer program (step 210). In the preferred embodiments, the logging of data for each code segment in step 210 is performed as the computer program is executed with predefined program execution conditions 132. Known mechanisms may be used to measure the execution time of a code segment. For example, software mechanisms could be used that measure or estimate the time or number of CPU cycles required to execute a code segment. In the alternative, a hardware timer can be used to directly measure the time of execution or number of CPU cycles for the code segment. Such a hardware timer might be used, for example, if a logic analyzer is used to generate a program trace of the execution of the computer program. The program trace can then be analyzed to determine the execution time for each code segment and the code segments (if any) called by each code segment.

In addition to logging data to an execution trace of the computer program, it is equally within the scope of the preferred embodiments to provide log data that is derived by statically analyzing the code and determining the execution time for a code segment based upon specified processor time to execute an instruction and based upon stated assumptions regarding cache hit rate, memory speed, etc. Step 210 expressly includes any and all mechanisms and methods for logging performance data for a code segment 126 in a computer program 125.

Figure 10:
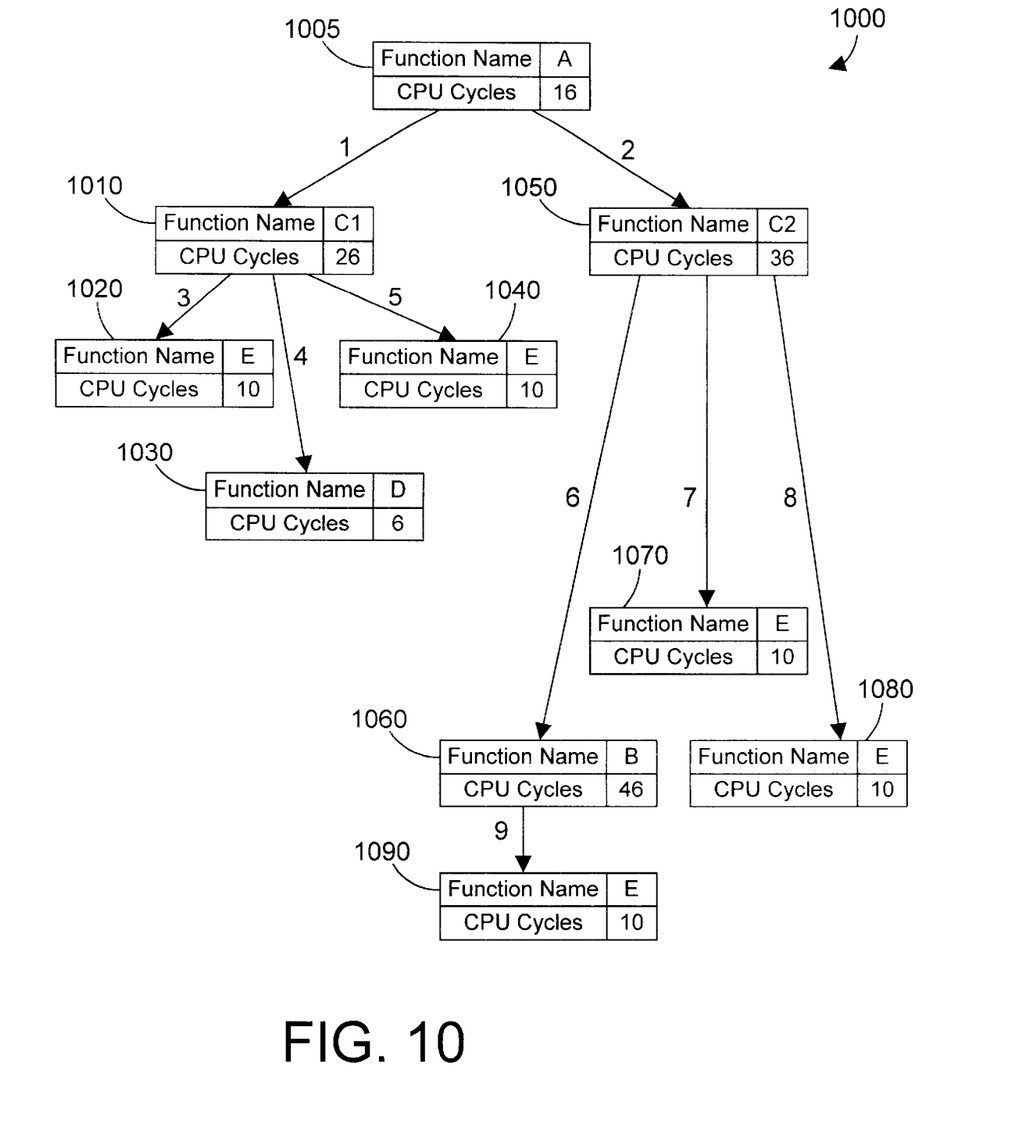
FIG. 10 is a graphical representation of the flow of the computer program that includes the code segments of FIGS. 4–9.

Once the logging of data in step 210 is complete, a graphical representation of the computer program is constructed (step 220) that contains the performance data that was logged in step 210. In the preferred embodiment, step 220 generates a tree of data structures (for example, as shown in FIG. 10), where each data structure represents a selected code segment and contains data relating to the execution time of the selected code segment, and where the organization of the tree defines which code segments are called by other code segments. Once the graphical representation of the computer program is constructed in step 220, a user can formulate one or more queries (step 230) to determine the performance of the computer program.

Once a query has been defined in step 230, the program is replayed by traversing the data structures in the graphical representation of the computer program to gather the query data (step 240). The query data is then output to the user (step 250). If more queries are needed (step 260=YES), method 200 loops back and continues at step 230. If no more queries are needed (step 260=NO), method 200 is done.

Method 200 provides a great deal more flexibility in analyzing the performance of a computer program when compared to prior art performance analysis techniques. The prior art can only determine performance bottlenecks in a single code segment. Method 200 allows the user to specify ad hoc queries (step 230) that can reveal that a group of code segments or interactions between code segments are causing one or more performance bottlenecks, even though no individual code segment is a performance bottleneck by itself.

Figure 3:
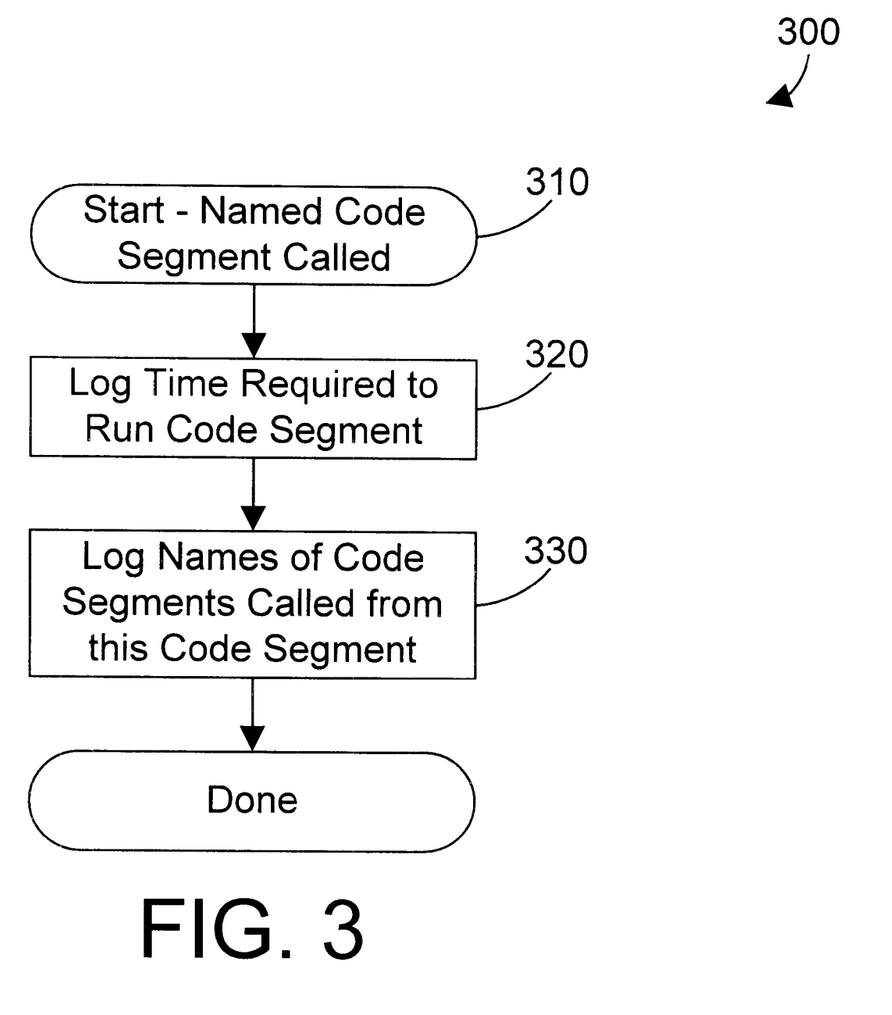
FIG. 3 is a flow diagram of a method for logging information for a named code segment while the code segment is being executed according to the preferred embodiments.

One suitable way of logging performance data in step 210 of FIG. 2 in accordance with the preferred embodiments uses method 300 shown in FIG. 3. Method 300 is invoked when a named code segment is called (step 310). As the code segment executes, the logger keeps track of the time of execution for the code segment (step 320) as well as the other code segments that were invoked (step 330). Once this information is logged, method 300 is done.

Figure 4:
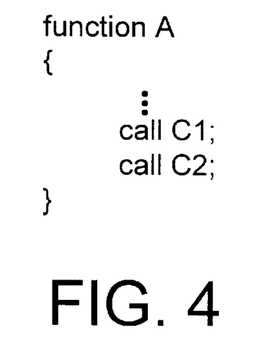
FIGS. 4–9 are each pseudo-code representations of different code segments that make up a sample computer program for illustrating the concepts of the preferred embodiments.
Figure 5:
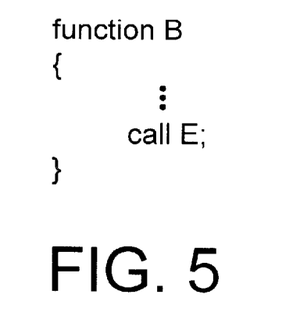
Figure 6:
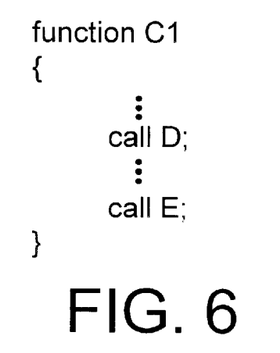
Figure 7:
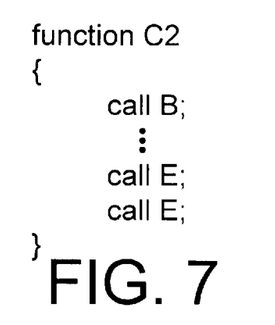
Figure 8:
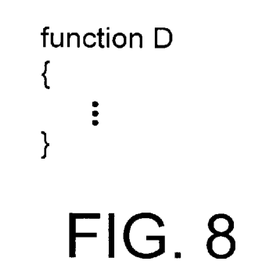
Figure 9:
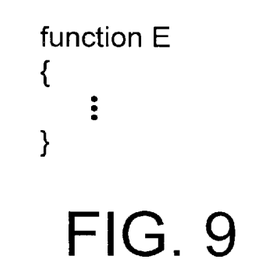

A specific example of a computer program and how the preferred embodiments gather and allow analysis of the performance data is shown in FIGS. 4–11. A sample pseudo code program is made up of the various functions shown in FIGS. 4–9, namely functions A, B, C1, C2, D, and E. As noted on the drawing sheet containing FIGS. 4–9, the three vertical dots are used to represent any code within the function (i.e., in-line code) that does not call another function. As shown in FIG. 4, function A includes a call to function C1 and a call to function C2. Referring to FIG. 5, function B includes a call to function E. Referring to FIG. 6, function C1 includes a call to function D and a call to function E. As shown in FIG. 7, function C2 includes a call to function B, and two calls to function E. FIGS. 8 and 9 show that neither function D nor function E call any of the other functions in the computer program. Note that the specific calls in FIGS. 4–9 are arbitrarily chosen to illustrate the concepts of the preferred embodiments.

With the computer program defined by the functions in FIGS. 4–9, we can now step through method 200 of FIG. 2 to illustrate the preferred embodiments using this specific example. First, the computer program is executed, and method 200 logs data for each code segment in the computer program. For the example in FIGS. 4–9, this means that method 200 logs performance data for each of functions A, B, C1, C2; D, and E. The performance data includes execution time for each function (expressed in CPU cycles for this example), and a list of functions that are called by each function. From this logged performance data, method 200 then constructs a graphical representation of the executed program that contains the logged data. One example of a suitable graphical representation 1000 is shown in FIG. 10, where the logged execution times are expressed in CPU cycles for each function and where the logged function calls are expressed by the tree configuration in FIG. 10, which indicates which functions were called by other functions. Graphical representation 1000 includes a data structure for each function that includes the execution time in CPU cycles for that function. Function A has a corresponding data structure 1005 that shows that it took 16 CPU cycles for function A to execute. Function C1 has a corresponding data structure 1010 that shows that it took 26 CPU cycles for function C1 to execute. Function C2 has a corresponding data structure 1050 that shows that it took 36 CPU cycles for function C2 to execute. Function B has a corresponding data structure 1060 that shows that it took 46 CPU cycles for function B to execute. Function D has a corresponding data structure 1030 that shows that it took 6 CPU cycles for function D to execute. Function E has several corresponding data structures 1020, 1040, 1070, 1080, and 1090 that each show that it took 10 CPU cycles for function E to execute for each of these different paths for reaching function E. Graphical representation 1000 also includes numbered paths 1–9 for convenience in discussing below the queries in FIG. 11.

Note that the preferred embodiment as shown in FIG. 1 includes a code segment logger 133 and a graphical program generator 134, which implies that the performance data is initially logged by the code segment logger 133, and the logged performance data is then converted into a graphical representation of the program using graphical program generator 133. However, it is equally within the scope of the preferred embodiments for the code segment logger 133 to both log the performance data and to dynamically build a graphical representation of the computer program as the computer program executes. Thus the functions of the graphical program generator 134 could be built into the code segment logger 133 within the scope of the preferred embodiments.

Figure 11:
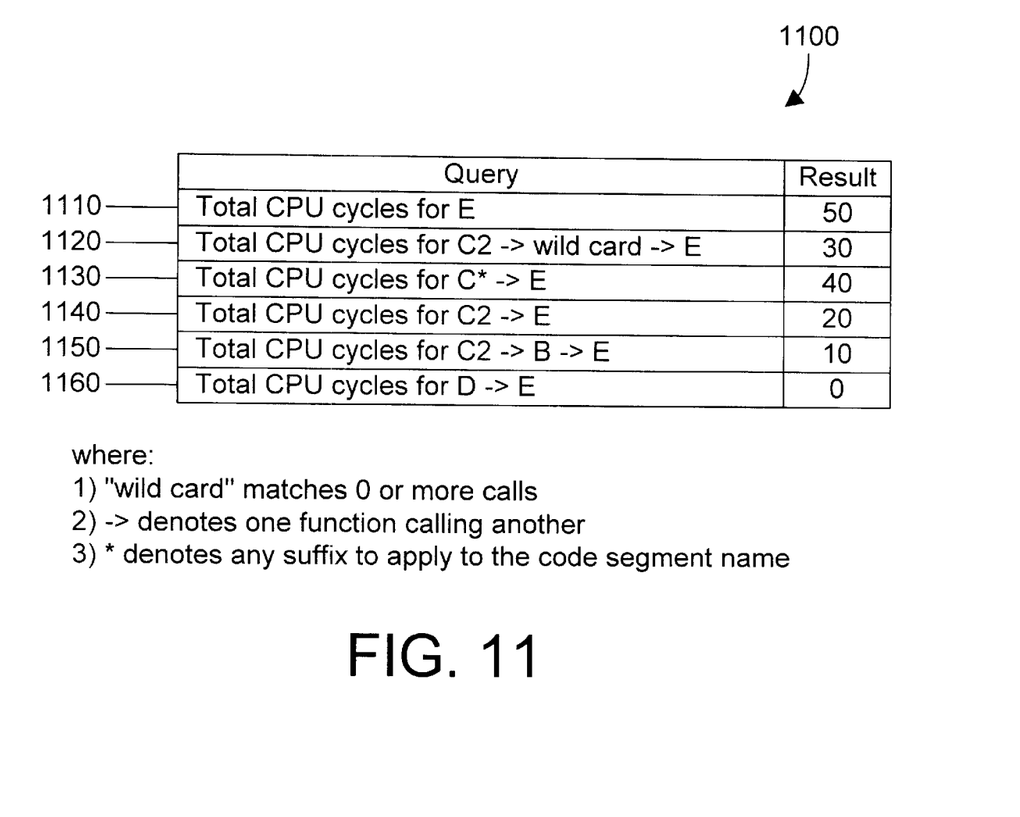
FIG. 11 is a query table showing the results of various queries that are performed by replaying the computer program using the graphical representation of FIG. 10.

Once the graphical representation of the program is constructed, as shown in FIG. 10, the user may then user query tool 135 (FIG. 1) to generate ad hoc queries on the performance data to determine various performance attributes, such as performance bottlenecks. Referring to FIG. 11, a query table 1100 illustrates six specific queries 1110–1160 to illustrate how the graphical representation in FIG. 10 is used to generate information (referred to herein as query data) that satisfies each query. Note from the legend in FIG. 11 that the query tool 135 defines a "wild card" which means that any 0 to N function calls that replace the wild card will satisfy the query. The "→" notation is used to indicate that one function calls another function. Thus, the example of A→B→C→D will match the query A→wild card→D. The "*" is an operator that includes any suffix for the characters preceding the "*". For example, C* means any function that begins with the capital letter C, which includes both C1 and C2 in our example.

In query 1110, the total CPU cycles for function E are requested. In response, the total number of CPU cycles for all occurrences of function E are added together. There are five occurrences of function E in the graphical representation 1000 of FIG. 10, namely 1020, 1040, 1070, 1080, and 1090. The program is "replayed" by stepping through the graphical representation 1000 to locate each of the five occurrences of function E. Each occurrence takes 10 CPU cycles, for a total of 50 CPU cycles for function E, as shown in the result column of query table 1100 of FIG. 11 for query 1110. Query 1120 requests the CPU cycles for C2→wild card→E. This means that the CPU cycles for any E function that is reached from the C2 function is included in the result. The "wild card" operator includes the paths 6–9, 7, and 8 to reach a function E, and the result is arrived at by beginning at function C2 1050 and replaying the execution of the computer program by tracing down the possible execution paths (which define sequences of execution of code segments) and computing the total CPU cycles that match the criteria. For query 1120, the total CPU cycles for function E that satisfy the query include the CPU cycles for function E in 1070, 1080, and 1090, for a total of 30.

The next query 1130 requests that CPU cycles for C*→E. Because the * operator includes all suffixes to the letter C, both functions C1 and C2 satisfy the C* portion of this query. The occurrences of function E that satisfy this query are 1020 and 1040 (through C1), and 1070 through 1080 (through C2). As the computer program is replayed by stepping through the graphical representation 1000, the CPU cycles for each of these four occurrences are added together to arrive at a result of 40 for this query 1130 as shown in the query table 1100.

Query 1140 requests the CPU cycles for C2→E. The paths that satisfy this query are path 7 to 1070 and path 8 to 1080. As the program is replayed by stepping through this graphical representation 1000, the CPU cycles in 1070 and 1080 are added together to arrive at a result of 20 for this query 1140 as shown in the query table 1100. Note that function E at 1090 is not considered even though it flows from function C2 through function B because the query C2→E requires that C2 invoke E directly.

Query 1150 requests the CPU cycles for C2→B→E. There is only one path that satisfies this query, path 6–9 to 1090. As the program is replayed by stepping through this graphical representation 1000, the CPU cycles in 1090 are gathered to arrive at a result of 10 for this query 1150 as shown in the query table 1100.

Query 1160 requests the CPU cycles for D→E. Function D never calls function E, so the result of this query is zero. As the program is replayed by stepping through the graphical representation 1000, the query tool 135 will determine that none of the functions meet this criteria, so the result for this query 1160 is zero, as shown in the query table 1100.

The results of the queries in FIG. 11 assume that the user is only interested in the CPU cycles of the last function in the query. Thus, in query 1120, only the cycles for function E that satisfy the query are included in the result. However, it is equally within the scope of the preferred embodiments to include in the result the CPU cycles for all intermediate functions that satisfy the query. In this scenario, a query adds the CPU cycles for all functions that are included in any path that satisfies the query. Thus, the query C2→wild card→E results in adding the CPU cycles of 1050, 1060, 1070, 1080, and 1090 together, to arrive at a result of 112 CPU cycles for this query. This and other mathematical variations of the preferred embodiments are expressly within their scope.

The simple program in FIGS. 4–9 and the simple queries in FIG. 11 are shown for the purpose of illustrating the method of the preferred embodiments. Of course, most computer programs will be considerably more complex, and the number of queries can be quite large and the complexity of the queries can be considerable. The simplified example presented herein will enable one skilled in the art to apply the methods disclosed herein to different types and sizes of computer programs and queries.

The apparatus and methods disclosed herein provide a way for a user to analyze the performance of a computer program in a way that has never been possible before. Known performance analysis tools consider whether a single code segment is a performance bottleneck. The present invention, in contrast, allows a user to specify ad hoc queries that can locate paths that span multiple code segments in the computer program that are bottlenecks when no particular code segment in the path is itself a bottleneck.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

I claim:

1. An apparatus comprising:
   (A) at least one processor;
   (B) a memory coupled to the at least one processor;
   (C) a computer program residing in the memory, the computer program comprising a plurality of code segments; and
   (D) a computer program performance analyzer residing in the memory that includes:
      a logger that logs performance data for the computer program as the computer program executes under a predefined set of program execution conditions; and
      a graphical program generator that generates a graphical representation of the performance data, the graphical representation including a plurality of nodes that correspond to code segments and a plurality of directional numbered paths between nodes.

2. The apparatus of claim 1 wherein the logged performance data comprises a number of processor cycles to execute each code segment.

3. The apparatus of claim 1 wherein the logger logs performance data for each code segment in the computer program.

4. The apparatus of claim 3 wherein the performance data for a selected code segment includes:
   (1) execution time for the selected code segment; and
   (2) all code segments, if any, called during the execution of the selected code segment.

5. The apparatus of claim 1 further comprising a query tool that allows a user to define at least one query and that gathers from the graphical representation information to satisfy the at least one query.

6. The apparatus of claim 5 further comprising a program replay mechanism that steps through the graphical representation of the performance data and gathers information from the performance data to satisfy the at least one query.

7. The apparatus of claim 1 wherein the number of a numbered path from a first node representing a first code segment to a second node representing a second code segment indicates a number of times the first code segment calls the second code segment.

8. The apparatus of claim 1 wherein the graphical representation includes execution time for each node.

9. An apparatus comprising:
   (1) at least one processor;
   (2) a memory coupled to the at least one processor;
   (3) a computer program residing in the memory, the computer program comprising a plurality of code segments;
   (4) a computer program performance analyzer residing in the memory that includes:
      (4A) a code segment logger that logs performance data for each code segment in the computer program as the computer program executes under a predefined set of program execution conditions, the performance data for a selected code segment including:
         (4A1) execution time for the selected code segment; and
         (4A2) all code segments, if any, called during the execution of the selected code segment;
      (4B) a graphical program generator that generates a graphical representation of the performance data, the graphical representation including a plurality of nodes that correspond to code segments and a plurality of directional numbered paths between nodes;
      (4C) a query tool that allows a user to define at least one query; and
      (4D) a program replay mechanism that steps through the graphical representation of the performance data and gathers information to satisfy the at least one query.

10. An apparatus comprising:
    a computer program residing in a memory, the computer program comprising a plurality of code segments;
    means for logging performance data for each code segment in the computer program as the computer program executes under a predefined set of program execution conditions;
    means for constructing a graphical representation of the performance data, the graphical representation including a plurality of nodes that correspond to code segments and a plurality of directional numbered paths between nodes;
    means for formulating a query; and
    means for gathering from the graphical representation information that satisfies the query.

11. A method for analyzing the performance of a computer program, the method comprising the steps of:
    (1) logging performance data for each code segment in the computer program as the computer program executes under a predefined set of program execution conditions;
    (2) constructing a graphical representation of the performance data, the graphical representation including a plurality of nodes that correspond to code segments and a plurality of directional numbered paths between nodes;
    (3) formulating a query; and
    (4) gathering from the graphical representation information that satisfies the query.

12. The method of claim 11 wherein the graphical representation includes execution time for each node.

13. The method of claim 12 wherein step (4) comprises stepping through the graphical representation of the performance data and gathering information to satisfy the at least one query by replaying at least one sequence of execution of code segments and gathering the information to satisfy the query as each code segment in the sequence of execution is replayed in the graphical representation.

14. The method of claim 11 wherein the step of formulating a query comprises the step of a user defining an ad hoc query.

15. The method of claim 11 wherein the number of a numbered path from a first node representing a first code segment to a second node representing a second code segment indicates a number of times the first code segment calls the second code segment.

16. A method for analyzing the performance of a computer program that includes a plurality of code segments, the method comprising the steps of:
    (1) logging performance data for each code segment in the computer program as the computer program executes under a predefined set of program execution conditions, the performance data for a selected code segment including:
       (1A) execution time for the selected code segment; and
       (2A) all code segments, if any, called during the execution of the selected code segment;
    (2) generating a graphical representation of the performance data, the graphical representation including a plurality of nodes that correspond to code segments and a plurality of directional numbered paths between nodes;
    (3) defining at least one query; and
    (4) stepping through the graphical representation of the performance data and gathering information to satisfy the at least one query.

17. A program product comprising:
    (A) a computer program performance analyzer that includes:
       a logger that logs performance data for a computer program that includes a plurality of code segments as the computer program executes under a predefined set of program execution conditions;
       a graphical program generator that generates a graphical representation of the performance data, the graphical representation including a plurality of nodes that correspond to code segments and a plurality of directional numbered paths between nodes; and
    (B) signal bearing media bearing the computer program performance analyzer.

18. The program product of claim 17 wherein the signal bearing media comprises recordable media.

19. The program product of claim 17 wherein the signal bearing media comprises transmission media.

20. The program product of claim 17 wherein the logged performance data comprises a number of processor cycles to execute each code segment.

21. The program product of claim 17 wherein the logger logs performance data for each code segment in the computer program.

22. The program product of claim 21 wherein the performance data for a selected code segment includes:
 (1) execution time for the selected code segment; and
 (2) all code segments, if any, called during the execution of the selected code segment.

23. The program product of claim 17 further comprising a query tool that allows a user to define at least one query and that gathers from the graphical representation information to satisfy the at least one query.

24. The program product of claim 23 further comprising a program replay mechanism that steps through the graphical representation of the performance data and gathers information from the graphical representation to satisfy the at least one query.

25. The program product of claim 17 wherein the number of a numbered path from a first node representing a first code segment to a second node representing a second code segment indicates a number of times the first code segment calls the second code segment.

26. The program product of claim 17 wherein the graphical representation includes execution time for each node.

27. A program product comprising:
 (A) a computer program performance analyzer that includes:
  (A1) a code segment logger that logs performance data for each code segment in the computer program as the computer program executes under a predefined set of program execution conditions, the performance data for a selected code segment including:
   (A1a) execution time for the selected code segment; and
   (A1b) all code segments, if any, called during the execution of the selected code segment;
  (A2) a graphical program generator that generates a graphical representation of the performance data, the graphical representation including a plurality of nodes that correspond to code segments and a plurality of directional numbered paths between nodes;
  (A3) a query tool that allows a user to define at least one query; and
  (A4) a program replay mechanism that steps through the graphical representation of the performance data and gathers information to satisfy the at least one query; and
 (B) signal bearing media bearing the computer program performance analyzer.

28. The program product of claim 27 wherein the signal bearing media comprises recordable media.

29. The program product of claim 27 wherein the signal bearing media comprises transmission media.

* * * * *